United States Patent
Kim (10) Patent No.: US 10,769,061 B2
(45) Date of Patent: Sep. 8, 2020

(54) MEMORY SYSTEM WITH READ RECLAIM DURING SAFETY PERIOD

(71) Applicant: SK hynix Inc., Gyeonggi-do (KR)

(72) Inventor: Jang-Hyun Kim, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 231 days.

(21) Appl. No.: 16/034,984

(22) Filed: Jul. 13, 2018

(65) Prior Publication Data

US 2019/0179743 A1     Jun. 13, 2019

(30) Foreign Application Priority Data

Dec. 12, 2017    (KR) .................. 10-2017-0170085

(51) Int. Cl.
     *G06F 12/02*        (2006.01)
     *G06F 11/10*        (2006.01)

(52) U.S. Cl.
     CPC ...... *G06F 12/0246* (2013.01); *G06F 11/1048* (2013.01); *G06F 11/1056* (2013.01)

(58) Field of Classification Search
     CPC ............. G06F 12/0246; G06F 11/1048; G06F 11/1056
     See application file for complete search history.

(56) References Cited

U.S. PATENT DOCUMENTS

| | | | | |
|---|---|---|---|---|
| 7,710,777 B1* | 5/2010 | Montierth | ............... | G11C 16/10 365/185.09 |
| 9,183,085 B1* | 11/2015 | Northcott | ............ | G06F 11/1068 |
| 9,201,789 B1* | 12/2015 | Kang | ................... | G06F 12/0246 |
| 9,727,488 B1* | 8/2017 | Drerup | .................. | G06F 12/128 |
| 2018/0101478 A1* | 4/2018 | Drerup | ................ | G06F 12/0897 |
| 2019/0196958 A1* | 6/2019 | Lee | ...................... | G06F 13/1642 |

FOREIGN PATENT DOCUMENTS

KR      1020160072883      6/2016

OTHER PUBLICATIONS

Lee, Junghee et al., "A Semi-Preemptive Garbage Collector for Solid State Drives", 2011, IEEE, pp. 12-21 (Year: 2011).*

\* cited by examiner

*Primary Examiner* — Matthew M Kim
*Assistant Examiner* — Indranil Chowdhury
(74) *Attorney, Agent, or Firm* — IP & T Group LLP (57) ABSTRACT

A memory system includes a buffer suitable for buffering victim block information, a queue suitable for queuing the victim block information, a scheduling unit suitable for detecting a read reclaim safety period and generating a trigger signal, a queue management unit suitable for detecting a remaining capacity of the queue during the safety period, a buffer management unit suitable for queuing as much of the buffered victim block information in the queue, as the remaining capacity of the queue during the safety period, and an execution unit suitable for performing a read reclaim operation based on the queued victim block information during the safety period.

20 Claims, 4 Drawing Sheets

MEMORY SYSTEM WITH READ RECLAIM DURING SAFETY PERIOD

CROSS-REFERENCE TO RELATED APPLICATIONS

The present application claims priority under 35 U.S.C. § 119(a) to Korean Patent Application No. 10-2017-0170085, filed on Dec. 12, 2017, the disclosure of which is incorporated herein by reference in its entirety.

BACKGROUND

1. Field

Various exemplary embodiments of the invention relate to a memory system that controls a read reclaim operation, and an operating method of the memory system.

2. Description of the Related Art

The computer environment paradigm has moved to ubiquitous computing, which enables computing systems to be used anytime and anywhere. Accordingly, the use of portable electronic devices such as mobile phones, digital cameras, and laptop computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts (e.g., a mechanical arm with a read/write head) as compared with a hard disk device. Examples of memory systems having such advantages include universal serial bus (USB) memory devices, memory cards having various interfaces, and solid state drives (SSD).

SUMMARY

Various embodiments of the invention are directed to a memory system capable of utilizing a temporary storage device for performing a read reclaim operation to secure stability of the read reclaim operation, and an operating method of the memory system.

In accordance with an embodiment of the present invention, a memory system includes: a buffer suitable for buffering victim block information; a queue suitable for queuing the victim block information; a scheduling unit suitable for detecting a read reclaim safety period and generating a trigger signal; a queue management unit suitable for detecting a remaining capacity of the queue during the safety period; a buffer management unit suitable for queuing as much of the buffered victim block information in the queue as much as the remaining capacity of the queue during the safety period; and an execution unit suitable for performing a read reclaim operation based on the queued victim block information during the safety period.

In accordance with an embodiment of the present invention, a memory system, comprising: at least one of nonvolatile memory device for storing a data; and a controller suitable for: detecting an error of the data to generate victim block information, monitoring execution of the request or the command to determine a safety period; loading some of the victim block information to be queued based on an available queuing size; and performing a read reclaim operation based on the queued victim block information during the safety period.

In accordance with an embodiment of the present invention, an operating method for a memory system includes: storing victim block information in a buffer; detecting a read reclaim safety period and generating a trigger signal; detecting a remaining capacity of a queue during the safety period; queuing as much of the buffered victim block information in the queue as the remaining capacity of the queue during the safety period; and performing a read reclaim operation based on the queued victim block information during the safety period.

DETAILED DESCRIPTION

Various embodiments of the invention are described below in more detail with reference to the accompanying drawings. We note, however, that the invention may be embodied in different other embodiments, forms and variations thereof and should not be construed as being limited to the embodiments set forth herein. Rather, the described embodiments are provided so that this disclosure will be thorough and complete, and will fully convey the invention to those skilled in the art to which this invention pertains. Throughout the disclosure, like reference numerals refer to like parts throughout the various figures and embodiments of the invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the invention.

The drawings are not necessarily to scale and, in some instances, proportions may have been exaggerated in order to clearly illustrate features of the embodiments. When an element is referred to as being connected or coupled to another element, it should be understood that the former can be directly connected or coupled to the latter, or electrically connected or coupled to the latter via an intervening element therebetween.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the invention.

As used herein, singular forms are intended to include the plural forms as well, unless the context clearly indicates otherwise.

It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the disclosure. It will be further understood that terms, such as those defined in commonly used dictionaries, should be interpreted as having a meaning that is consistent with theft meaning in the context of the disclosure and the relevant art and will not be interpreted in an idealized or overly formal sense unless expressly so defined herein.

In the following description, numerous specific details are set forth in order to provide a thorough understanding of the invention. The invention may be practiced without some or all these specific details. In other instances, well-known process structures and/or processes have not been described in detail in order not to unnecessarily obscure the invention.

It is also noted, that in some instances, as would be apparent to those skilled in the relevant art, a feature or element described in connection with one embodiment may be used singly or in combination with other features or elements of another embodiment, unless otherwise specifically indicated.

Figure 1:
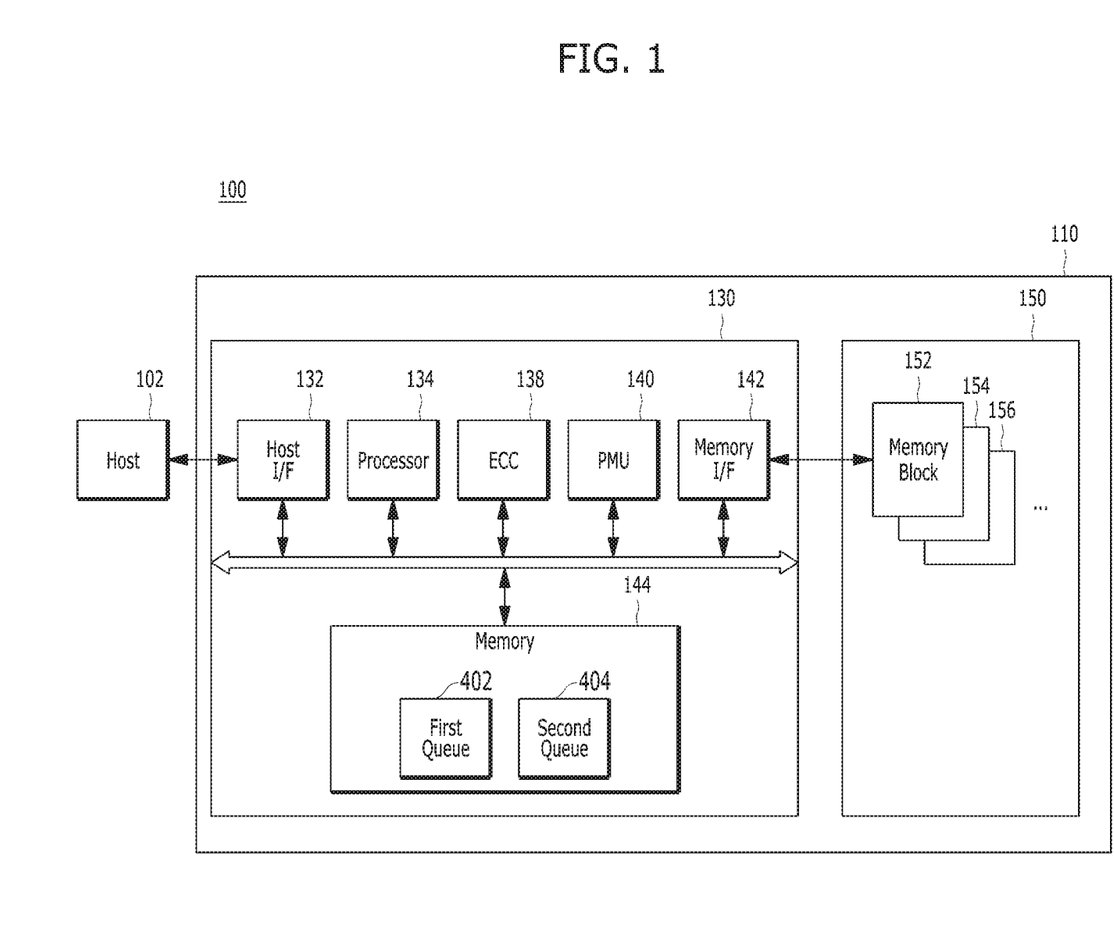
FIG. 1 is a block diagram illustrating a data processing system including a memory system in accordance with an embodiment of the disclosure.

FIG. 1 is a block diagram illustrating a data processing system 100 including a memory system 110 in accordance with an embodiment of the invention.

Referring to FIG. 1, the data processing system 100 may include a host 102 electrically coupled to the memory system 110.

By way of example but not limitation, the host 102 may include portable electronic devices such as a mobile phone, MP3 player and laptop computer or non-portable electronic devices such as a desktop computer, a game machine, a TV and a projector.

The host 102 may include at least one OS (operating system). The OS may manage and control overall functions and operations of the host 102. The OS may support an operation between the host 102 and a user, which may be achieved or implemented by the data processing system 100 or the memory system 110. The OS may support functions and operations requested by a user. By way of example but not limitation, the OS may be divided into a general OS and a mobile OS, depending on whether it is customized for the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a customized function of providing a mobile service to users and a power saving function of a system may include Android, iOS and Windows Mobile. The host 102 may include a plurality of Os's. The host 102 may execute an OS to perform an operation corresponding to a user's request on the memory system 110. Here, the host 102 may provide a plurality of commands corresponding to a user's request to the memory system 110. The memory system 110 may perform certain operations corresponding to the plurality of commands, that is, corresponding to the user's request.

The memory system 110 may store data for the host 102 in response to a request of the host 102. Non-limited examples of the memory system 110 may include a solid state drive (SSD), a multi-media card (MMC), a secure digital (SD) card, a universal storage bus (USB) device, a universal flash storage (UFS) device, a compact flash (CF) card, a smart media card (SMC), a personal computer memory card international association (PCMCIA) card and a memory stick. The MMC may include an embedded MMC (eMMC), a reduced size MMC (RS-MMC) and a micro-MMC. The SD card may include a mini-SD card and a micro-SD card.

The memory system 110 may include various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), a resistive RAM (RRAM), and a flash memory.

The memory system 110 may include a memory device 150 and a controller 130. The memory device 150 may store data for the host 102, while the controller 130 may control data storage into the memory device 150.

The controller 130 and the memory device 150 may be integrated into a single semiconductor device, which may be included in the various types of memory systems as described above. By way of example but not limitation, the controller 130 and the memory device 150 may be integrated as a single semiconductor device to constitute an SSD. When the memory system 110 is used as an SSD, the operating speed of the host 102 connected to the memory system 110 can be improved. In another example, the controller 130 and the memory device 150 may be integrated as a single semiconductor device to constitute a memory card. By way of example but not limitation, the controller 130 and the memory device 150 may constitute a memory card such as a PCMCIA (personal computer memory card international association) card, a CF card, a SMC (smart media card), a memory stick, an MMC including a RS-MMC and a micro-MMC, a SD card including a mini-SD, a micro-SD and a SDHC, an UFS device, and the like.

The memory system 110 may be available for a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device which may retain stored data even though power is not supplied. The memory device 150 may store data provided from the host 102 through a write operation, and output data stored therein to the host 102 through a read operation. In an embodiment, the memory device 150 may include a plurality of memory dies (not shown), each memory die may include a plurality of planes (not shown), each plane may include a plurality of memory blocks 152 to 156, each of the memory blocks 152 to 156 may include a plurality of pages, and each of the pages may include a plurality of memory cells coupled to a word line. In an embodiment, the memory device 150 may be a flash memory having a 3-dimensional (3D) stack structure.

The structure of the memory device 150 and the 3D stack structure of the memory device 150 will be described in detail below with reference to FIGS. 2 to 4.

The controller 130 may control the memory device 150 in response to a request from the host 102. By way of example but not limitation, the controller 130 may provide data read from the memory device 150 to the host 102, and store data provided from the host 102 into the memory device 150. For these operations, the controller 130 may control read, write, program, and erase operations of the memory device 150.

More specifically, the controller 130 may include a host interface (I/F) unit 132, a processor 134, an error correction code (ECC) unit 138, a Power Management Unit (PMU) 140, a memory interface unit (I/F) 142, a memory 144, a victim block detecting unit 410, a scheduling unit 412, a buffer management unit 414, a queue management unit 416, and an execution unit 418. The host interface (I/F) unit 132, the error correction code (ECC) unit 138, the Power Management Unit (PMU) 140, the memory interface unit (I/F) 142, the victim block detecting unit 410, the scheduling unit 412, the buffer management unit 414, the queue management unit 416, and the execution unit 418 may include all circuits, systems, firmware and devices necessary for their respective operations and functions.

The host interface unit 132 may process a command and data of the host 102. The host interface unit 132 may communicate with the host 102 under one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (DATA), enhanced small disk interface (ESDI) and integrated drive electronics (IDE). The host interface unit 132 may be controlled by, or implemented in, a firmware such as a host interface layer (HIL) for exchanging data with the host 102.

Further, the ECC unit 138 may correct error bits of data to be processed by the memory device 150 and may include an ECC encoder and an ECC decoder. The ECC encoder may perform an error correction encoding on data, which may be programmed into the memory device 150, to generate data to which a parity bit is added. The data with the parity bit may be stored in the memory device 150. The ECC decoder may detect, and correct, an error contained in the data read from the memory device 150. In other words, when an error is detected, the ECC unit 138 may perform an error correction decoding process on the data read from the memory device 150 through an ECC code used during an ECC encoding process. According to a result of the error correction decoding process, the ECC unit 138 may output a signal, e.g., an error correction success/fail signal. When the number of error bits is more than a threshold value of correctable error bits, the ECC unit 138 may not correct the error bits. The ECC unit 138 may output an error correction fail signal.

By way of example but not limitation, the ECC unit 138 may perform error correction through a coded modulation based on a Low Density Parity Check (LDPC) code, a Bose-Chaudhri-Hocquenghem (BCH) code, turbo code, a Reed-Solomon code, a convolution code, a Recursive Systematic Code (RSC), a Trellis-Coded Modulation (TCM) and a Block coded modulation (BCM). However, the ECC unit 138 is not limited thereto. The ECC unit 138 may include all relevant circuits, modules, systems or devices for use in error correction.

The PMU 140 may manage an electrical power used and provided in the controller 130.

The memory interface unit 142 may work as a memory/storage interface for providing an interface between the controller 130 and the memory device 150 such that the controller 130 may control the memory device 150 in response to a request from the host 102. When the memory device 150 is a flash memory or specifically a NAND flash memory, the memory interface unit 142 may be NAND flash controller (NFC). The memory interface unit 142 may generate a control signal for the memory device 150 to process data provided into the memory device 150 under the control of the processor 134. The memory interface unit 142 may work as an interface (e.g., a NAND flash interface) for processing a command and data between the controller 130 and the memory device 150. Specifically, the memory interface unit 142 may support data transfer between the controller 130 and the memory device 150. The memory interface unit 142 may include a firmware, that is, a flash interface layer (FIL) for exchanging data with the memory device 150.

The memory 144 may serve as a working memory of the memory system 110 and the controller 130. The memory 144 may store data for driving the memory system 110 and the controller 130. The controller 130 may control the memory device 150 to perform read, program, and erase operations in response to a request from the host 102. The controller 130 may output data, read from the memory device 150, to the host 102. The controller 130 may store data, entered from the host 102, into the memory device 150. The memory 144 may store data required for the controller 130 and the memory device 150 to perform these operations.

The memory 144 may be a volatile memory. By way of example but not limitation, the memory 144 may be a static random access memory (SRAM) or dynamic random access memory (DRAM). The memory 144 may be disposed within or out of the controller 130. FIG. 1 exemplifies the memory 144 disposed within the controller 130. In an embodiment, the memory 144 may be an external volatile memory having a memory interface transferring data between the memory 144 and the controller 130.

As described above, the memory 144 may include a program memory, a data memory, a write buffer/cache, a read buffer/cache, a data buffer/cache and a map buffer/cache to store data, required to perform data write and read operations between the host 102 and the memory device 150, and data required for the controller 130 and the memory device 150 to perform these operations.

The processor 134 may control the overall operations of the memory system 110. The processor 134 may use firmware to control the overall operations of the memory system 110. The firmware may be referred to as a flash translation layer (FTL).

By way of example but not limitation, the controller 130 may perform an operation requested by the host 102 in the memory device 150 through the processor 134, which may be implemented by a microprocessor, a CPU, or the like. In other words, the controller 130 may perform a command operation corresponding to a command received from the host 102. Herein, the controller 130 may perform a foreground operation as the command operation corresponding to the command received from the host 102. By way of example but not limitation, the foreground operation may include a program operation corresponding to a write command, a read operation corresponding to a read command, an erase operation corresponding to an erase command, and a parameter set operation corresponding to a set parameter command, or a set feature command as a set command.

Also, the controller 130 may perform a background operation on the memory device 150 through the processor 134, which may be realized by a microprocessor or a CPU. Herein, the background operation performed on the memory device 150 may include an operation of copying and processing data stored in some memory blocks among the memory blocks 152 to 156 of the memory device 150 into other memory blocks, e.g., a garbage collection (GC) operation, an operation for performing swapping between the memory blocks 152 to 156 of the memory device 150 or between the data of the memory blocks 152 to 156, e.g., a wear-leveling (WL) operation, an operation for storing the map data stored in the controller 130 in the memory blocks 152 to 156 of the memory device 150, e.g., a map flush operation, or an operation for managing bad blocks of the memory device 150, e.g., a bad block management operation for detecting and processing bad blocks among the memory blocks 152 to 156 included in the memory device 150.

Also, in the memory system 110 in accordance with an embodiment of the invention, the controller 130 may perform a plurality of command executions corresponding to a plurality of commands received from the host 102, e.g., a plurality of program operations corresponding to a plurality of write commands, a plurality of read operations corresponding to a plurality of read commands, and a plurality of erase operations corresponding to a plurality of erase commands, in the memory device 150. Also, the controller 130 may update a meta-data (particularly, a map data) sporadically or periodically, according to the plurality of command executions.

The processor 134 of the controller 130 may include a management unit (not illustrated) for performing a bad management operation of the memory device 150. The management unit may perform a bad block management operation of checking a bad block, in which a program fail occurs due to the characteristic of a NAND flash memory during a program operation, among the plurality of memory blocks 152 to 156 included in the memory device 150. The management unit may write the program-failed data of the bad block to a new memory block. When the memory device 150 has a 3D stack structure, the bad block management operation may reduce the use efficiency of the memory device 150 and the reliability of the memory system 110. Thus, a bad block management operation which performs with more reliability is needed. Hereafter, the memory device of the memory system in accordance with the embodiment of the invention is described in detail with reference to FIGS. 2 to 3.

Figure 2:
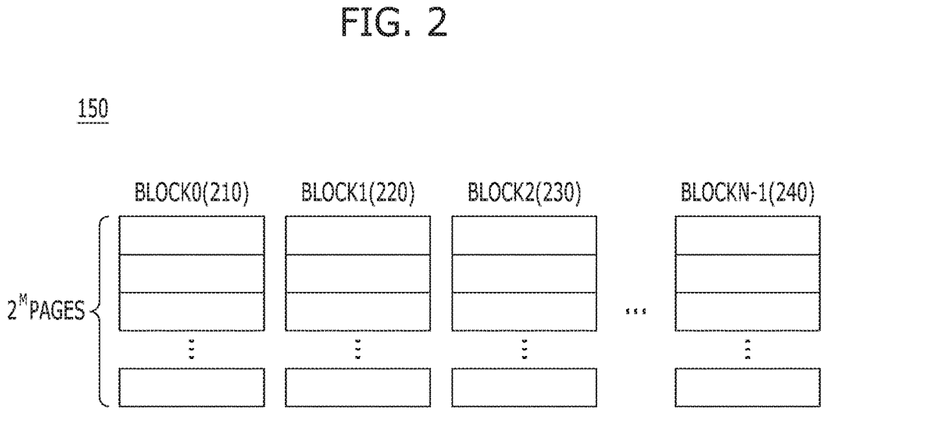
FIG. 2 is a schematic diagram illustrating an exemplary configuration of a memory device employed in the memory system shown in FIG. 1.
Figure 3:
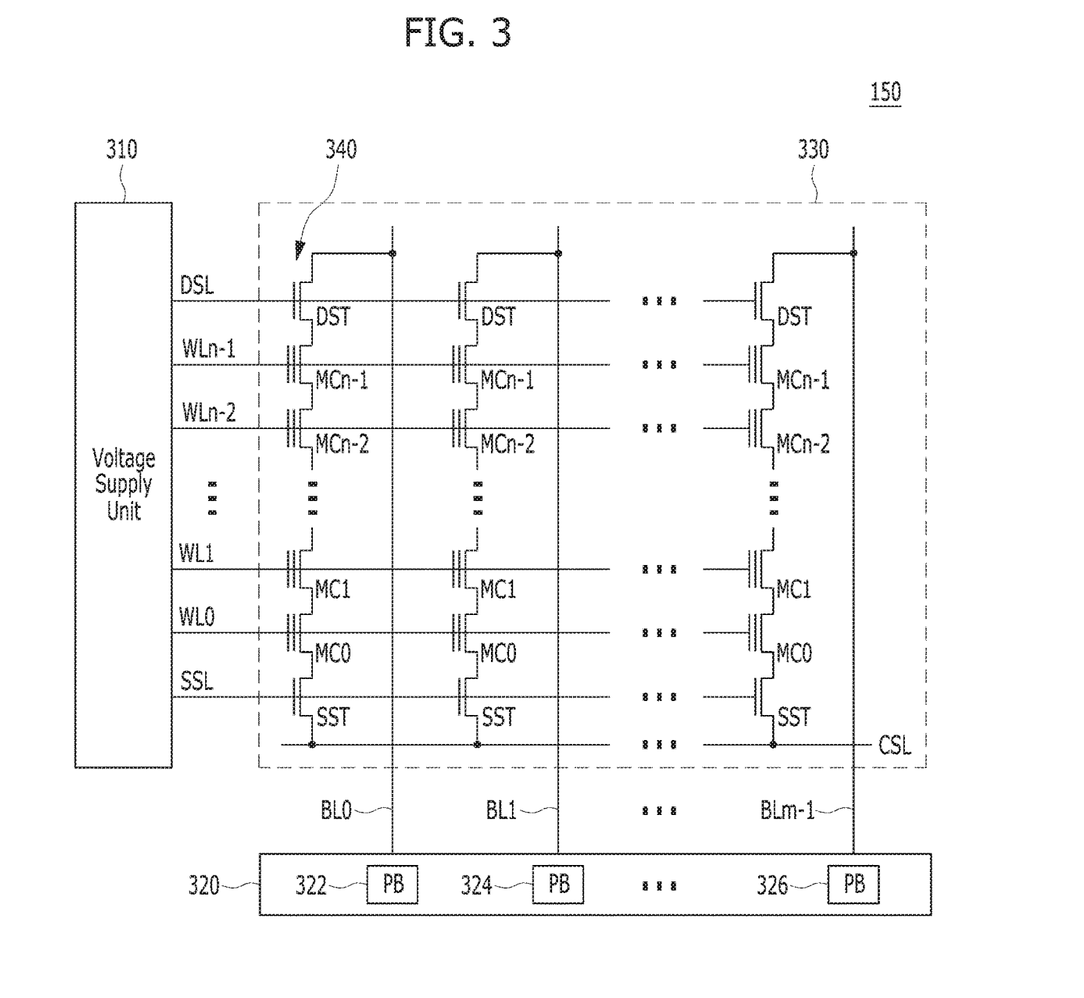
FIG. 3 is a circuit diagram illustrating an exemplary configuration of a memory cell array of a memory block in the memory device shown in FIG. 1.

FIG. 2 is a schematic diagram illustrating the memory device 150 and FIG. 3 is a circuit diagram illustrating an exemplary configuration of a memory cell array of a memory block 330 in the memory device 150.

Referring to FIG. 2, the memory device 150 may include a plurality of memory blocks BLOCK0 to BLOCKN-1 and each of the blocks BLOCK0 to BLOCKN-1 may include a plurality of pages, for example, $2^M$ pages, the number of which may vary according to circuit design. Herein, although it is described that each of the memory blocks include $2^M$ pages, each of the memory blocks may include M pages as well. Each of the pages may include a plurality of memory cells that are coupled to a plurality of word lines WL.

Also, memory cells included in the respective memory blocks BLOCK0 to BLOCKN-1 may be one or more of a single level cell (SLC) memory block storing 1-bit data and/or a multi-level cell (MLC) memory block storing 2-bit data. Hence, the memory device 150 may include SLC memory blocks or MLC memory blocks, depending on the number of bits which can be expressed or stored in each of the memory cells in the memory blocks. The SLC memory blocks may include a plurality of pages which are embodied by memory cells each storing one-bit data, The SLC memory blocks may generally have higher data computing performance and higher durability as compared with the MLC memory blocks. The MLC memory blocks may include a plurality of pages which are embodied by memory cells each storing multi-bit data (for example, 2 or more bits). The MLC memory blocks may generally have a larger data storage space than the SLC memory block, that is, higher integration density. In another embodiment, the memory device 150 may include a plurality of triple level cell (TLC) memory blocks. In yet another embodiment, the memory device 150 may include a plurality of quadruple level cell (QLC) memory blocks. The TCL memory blocks may include a plurality of pages which are embodied by memory cells each capable of storing 3-bit data. The QLC memory blocks may include a plurality of pages which are embodied by memory cells each capable of storing 4-bit data.

Although the embodiment of the invention exemplarily describes that the memory device 150 may be the nonvolatile memory, it may implemented by any one of a phase change random access memory (PCRAM), a resistive random access memory (RRAM(ReRAM)), a ferroelectrics random access memory (FRAM), and a spin transfer torque magnetic random access memory (STT-RAM(STT-MRAM)).

The memory blocks 210, 220, 230, 240 may store the data transferred from the host 102 through a program operation, and transfer data stored therein to the host 102 through a read operation.

Referring to FIG. 3, the memory block 330 may include a plurality of cell strings 340 coupled to a plurality of corresponding bit lines BL0 to BLm-1. The cell string 340 of each column may include one or more drain select transistors DST and one or more source select transistors SST. Between the drain and source select transistors DST and SST, a plurality of memory cells MC0 to MCn-1 may be coupled in series. In an embodiment, each of the memory cell transistors MC0 to MCn-1 may be embodied by an MLC capable of storing data information of a plurality of bits. Each of the cell strings 340 may be electrically coupled to a corresponding bit line among the plurality of bit lines BL0 to BLm-1. For example, as illustrated in FIG. 3, the first cell string is coupled to the first bit line BL0, and the last cell string is coupled to the last bit line BLm-1.

Although FIG. 3 illustrates NAND flash memory cells, the present disclosure is not limited thereto. It is noted that the memory cells may be NOR flash memory cells, or hybrid flash memory cells including two or more kinds of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages, including a program voltage, a read voltage, and a pass voltage, to supply to the word lines according to an operation mode. The program voltage, the read voltage and the pass voltage may have different voltage levels for their functions. The voltage generation operation of the voltage supply unit 310 may be controlled by a control circuit (not illustrated). Under the control of the control circuit, the voltage supply unit 310 may select one of the memory blocks (or sectors) of the memory cell array and select one of the word lines of the selected memory block. The voltage supply unit 310 may provide different word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for controlling a level of current flowing through bit lines according to data to be stored in the memory cell array. During a program operation, the read/write circuit 320 may receive from a buffer (not illustrated) data to be stored into the memory cell array. The read/write circuit 320 may control a level of current flowing through bit lines according to the received data. The read/write circuit 320 may include a plurality of page buffers 322 to 326 respectively corresponding to columns (or bit lines) or column pairs (or bit line pairs). Each of the page buffers 322 to 326 may include a plurality of latches (not illustrated).

A read disturbance phenomenon refers to a phenomenon in which a plurality of page read operations are performed in a specific block to increase the cell-level of other pages included in the block. When the read disturbance phenomenon is accumulated, error correction capability of the ECC decoder may be exceeded. To avoid an unrecoverable error, a read reclaim operation is achieved as follows: transferring or moving a valid page, stored in a victim block, into a target block and erasing remaining pages included in the victim block, when a read count is equal to, or greater than, a threshold value.

According to a prior art, whenever a victim block is detected in the memory system, information on the victim block (hereinafter referred to as "victim block information") is queued. The read reclaim operation is sequentially performed on a corresponding memory block based on the queued victim block information. The memory device includes a plurality of user data blocks and system data blocks. The user data blocks store data entered from the host, while the system data blocks store data related to operations of the memory system.

A conventional memory system may have a problem related to queuing timing of the victim block information. Specifically, when a first read reclaim operation performed during the background operation of the memory system, such as a garbage collection operation and a map updating operation, is performed on the system data blocks, a specific system data block is detected as the victim block and information on the system data block is queued, thereby causing inconsistency in system information when a second read reclaim operation is performed on the system data block. In other words, when the first and second read reclaim operations are redundantly performed on the system data block, the system information stored in the system data block becomes inconsistent.

In addition, conventional memory systems may have a problem related to a queuing size of the victim block information. Specifically, when not only the system data blocks but also the user data blocks are detected as the victim blocks and information on the blocks is queued, a portion of the victim block information may not be queued and discarded if the queued block information exceeds the queuing size thereof.

According to an embodiment of the invention, it is possible to avoid the problems of queuing timing and queuing size, which are described above.

Figure 4:
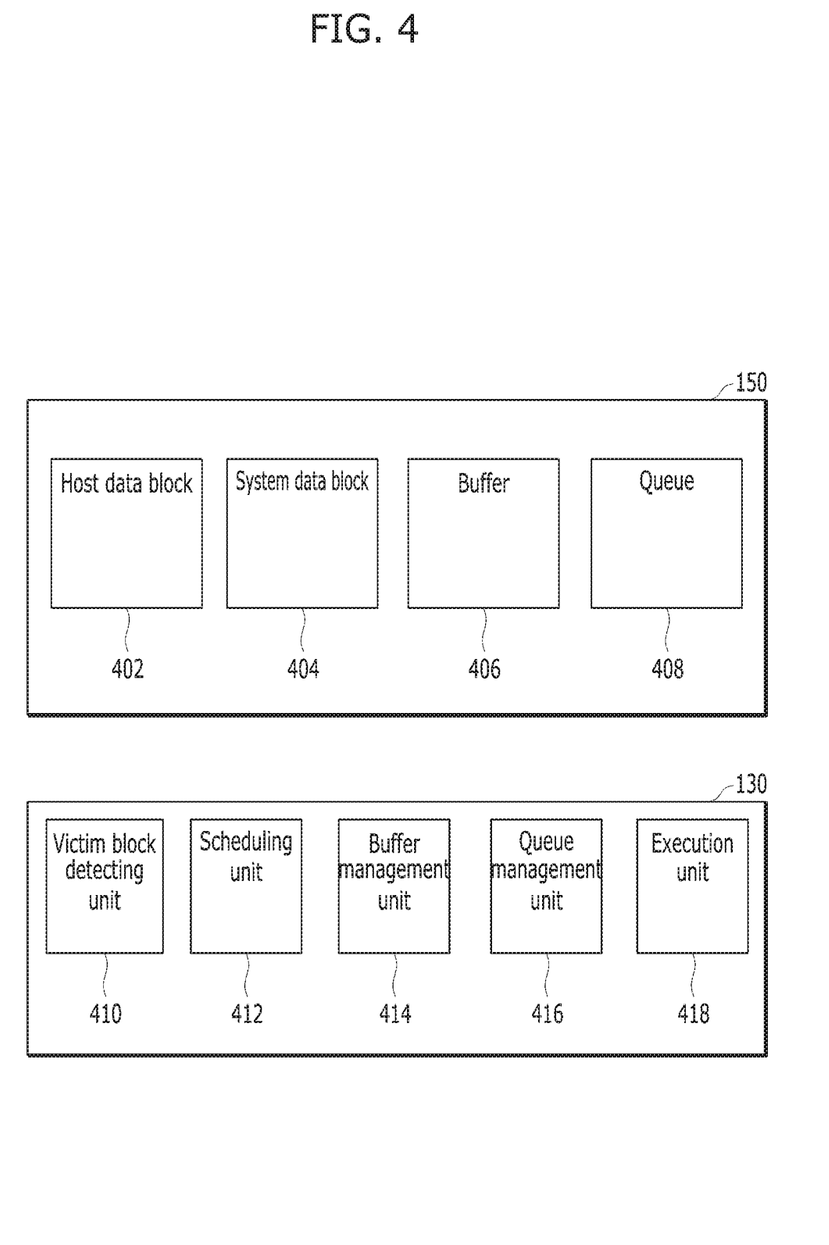
FIG. 4 is a schematic diagram illustrating an exemplary configuration of a memory device and a controller employed in a memory system shown in FIG. 1.

FIG. 4 is a schematic diagram illustrating an exemplary configuration of the memory device 150 and the controller 130 employed in the memory system 110 shown in FIG. 1.

The controller 130 may include a victim block detection unit 410, a scheduling unit 412, a buffer management unit 414, a queue management unit 416, and an execution unit 418. The victim block detection unit 410, the scheduling unit 412, the buffer management unit 414, the queue management unit 416, and the execution unit 418 may include all circuits, systems, firmware and devices necessary for their respective operations and functions.

The memory device 150 may include a host data block 402, a system data block 404, a buffer 406, and a queue 408.

The host data block 402 may store host data, while the system data block 404 may store system data. Although not illustrated, a plurality of host data blocks and a plurality of system data blocks may constitute a memory cell array included in the memory device.

Among a plurality of memory blocks included in the memory cell array, the victim block detection unit 410 may detect a memory block having read data which includes an unrecoverable error, or a memory block having a read count which exceeds a threshold value and utilize the detected memory block as a read reclaim target block, i.e., a victim block.

The victim block detection unit 410 may temporarily store information on a detected victim block (hereinafter referred to as "victim block information"), for example, an address of the victim block in the buffer 406.

The scheduling unit 412 may detect a read reclaim safety period (hereinafter referred to as a "safety period") to transmit a read reclaim trigger signal (hereinafter referred to as a "trigger signal"). Specifically, the scheduling unit 412 may transmit the trigger signal to at least one of the buffer management unit 414, the queue management unit 416 and the execution unit 418 during the safety period to control a read reclaim operation to be performed during the safety period. A risk period, unlike the safety period, may be a period where the read reclaim operation is performed on a system data block during a background operation of the memory system, such as a garbage collection operation and a map updating operation. That is, the risk period may be a period where the system data block is in a busy state. When a specific system data block is detected as the victim block by the victim block detection unit 410 and the read reclaim operation is performed on the system data block during the risk period, the read reclaim operation may be redundantly performed on a single block, and thus system information stored in the system data block may become inconsistent. Since the safety period, which is a remaining period excluding the risk period, is a period where the read reclaim operation is not performed on the system data block during the background operation, that is, the system data block is in an idle state, the victim block detection unit 410 may solely perform the read reclaim operation on the victim block detected from the system data block. According to the embodiment of the invention, the read reclaim operation may be performed during the safety period based on the trigger signal transmitted from the scheduling unit 412 so that the system information may not be inconsistent.

The queue management unit 416 may transmit remaining capacity information of the queue 408 corresponding to the trigger signal transmitted from the scheduling unit 412 to the buffer management unit 414. A remaining capacity may represent a capacity that the queue 408 is able to store information at beginning of the safety period.

The buffer management unit 414 may queue the victim block information stored in the buffer 406 in the queue 408, corresponding to the trigger signal transmitted from the scheduling unit 412. The buffer management unit 414 may queue the victim block information in the queue 408 based on the remaining capacity information of the queue 408 transmitted from the queue management unit 416. For example, the buffer management unit 414 may read out the victim block information based on the remaining capacity information from the buffer 406. The amount of the victim block information may be determined by an available queuing size of the queue 408, for an appropriate queuing operation of the queue 408.

The buffer management unit 414 may remove the victim block information queued in the queue 408 from the buffer 406.

The execution unit 418 may perform the read reclaim operation based on the victim block information queued in the queue 408 in response to the trigger signal transmitted from the scheduling unit 412.

Figure 5:
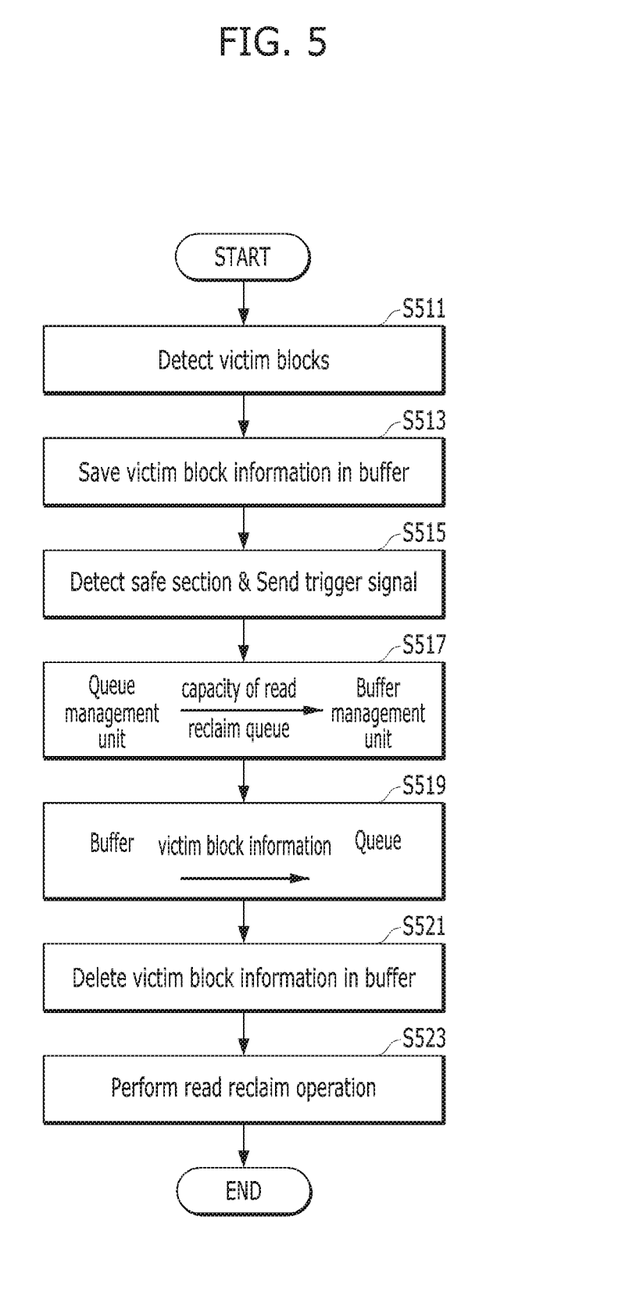
FIG. 5 is a flowchart illustrating a read reclaim operation shown in FIG. 4.

FIG. 5 is a flowchart illustrating the read reclaim operation shown in FIG. 4.

The read reclaim operation in accordance with the embodiment of the invention may include detecting the victim block in step S511, buffering the victim block information in the buffer 406 in step S513, detecting the safety period and transmitting the read reclaim trigger signal to the buffer management unit 414, the queue management unit 416 and the execution unit 418 in step S515, detecting the remaining capacity information of the queue 408 in response to the trigger signal and transmitting the detected remaining capacity information to the buffer management unit 414 in step S517, queuing the victim block information in the queue 408 in response to the trigger signal in step S519, removing the victim block information queued in the queue 408 from the buffer 406 in step S521, and performing the read reclaim operation on the victim block based on the victim block information in step S523.

In step S511, the victim block which is a target for the read reclaim operation may be detected. The memory cell array included in the memory device may include a plurality of host data blocks and a plurality of system data blocks. In step S511, a memory block, outputting a read data including an unrecoverable error, or a memory block whose read count exceeds a threshold value among the plurality of memory blocks included in the memory cell array may be detected as a read reclaim target block, i.e., the victim block.

In step S513, the victim block information detected in step S511, for example, the address of the victim block may be buffered in the buffer 406.

The victim block information stored in step S511 may not be immediately transmitted to the queue 408. In steps S515, S517, S519, timing of transmitting the victim block information from the buffer 406 to the queue 408 and a capacity of the victim block information may be determined.

In step S515, to determine the timing of transmitting the victim block information, which is stored in the buffer 406 in step S513, to the queue 408, the read reclaim safety period may be detected, and the read reclaim trigger signal may be generated. Since the read reclaim operation, which is performed during the background operation of the memory system such as the garbage collection operation and the map updating operation, is not performed on the system data block during the safety period, the read reclaim operation may be solely performed on the victim block, which is detected from the system block in step S511. In step S515, during the safety period in which system information inconsistency is not likely to occur, the trigger signal may be transmitted to the buffer management unit 414, the queue management unit 416 and the execution unit 418 so that the read reclaim operation may be performed.

In step S517, the remaining capacity information of the queue 408 may be detected in response to the trigger signal which is transmitted in step S515. The remaining capacity may represent a capacity of the queue 408 which is able to store information during the safety period.

In step S519, the victim block information may be queued in the queue 408 based on the remaining capacity information, which is detected in step S517. For example, the victim block information of a size that the queue 408 is currently able to queue may be read out from the buffer 406 and queued in the queue 408 based on the remaining capacity information.

In step S521, the victim block information queued in the queue 408 in step S519 may be removed from the buffer 406.

In step S523, the read reclaim operation may be performed based on the victim block information queued in the queue 408 in response to the trigger signal transmitted from the scheduling unit 412.

According to the embodiment of the invention, the victim block information may be temporarily stored in the buffer, and subsequently be transmitted to the queue during the safety period under the control of the scheduling unit included in the controller, whereby an error is prevented from occurring due to system information inconsistency with a read reclaim target block occurring in the system block.

In addition, according to the embodiment of the invention, as much of the victim block information may be queued in the queue as the remaining capacity of the queue which is under the control of the queue management unit included in the controller, whereby it is possible to solve the conventional problem that the capacity of the queue is exceeded.

While the invention has been described with respect to specific embodiments, it will be apparent to those skilled in the art that various changes and modifications may be made without departing from the spirit and scope of the invention as defined in the following claims.

What is claimed is:

1. A memory system, comprising:
a buffer suitable for buffering victim block information;
a queue suitable for queuing the victim block information;

a scheduling unit suitable for detecting a read reclaim safety period and generating a trigger signal;
a queue management unit suitable for detecting a remaining capacity of the queue during the safety period;
a buffer management unit suitable for queuing as much of the buffered victim block information in the queue, as the remaining capacity of the queue during the safety period; and
an execution unit suitable for performing a read reclaim operation based on the queued victim block information during the safety period.

2. The memory system of claim 1, wherein the queue management unit, the buffer management unit and the execution unit operate in response to the trigger signal.

3. The memory system of claim 1, wherein the victim block information is information on a target block for the read reclaim operation among host data blocks and system data blocks included in a memory device.

4. The memory system of claim 3, wherein the safety period is a period where a system data block which is a target for the read reclaim operation is in an idle state.

5. The memory system of claim 4, wherein the remaining capacity is a capacity of the queue being able to store the victim block information at a beginning of the safety period.

6. The memory system of claim 4, wherein the idle state is a state where the read reclaim operation is not performed on the system data block.

7. The memory system of claim 3, wherein the target block for the read reclaim operation is a block whose read count is equal to or higher than a predetermined threshold value.

8. The memory system of claim 1, further comprising:
a victim block detection unit suitable for detecting a victim block which is a target for the read reclaim operation, and storing the detected victim block information in the buffer.

9. The memory system of claim 1, wherein the buffer management unit removes the victim block information queued in the queue among the buffered victim block information from the buffer.

10. The memory system of claim 1, wherein the victim block information is an address of a victim block which is a target for the read reclaim operation.

11. An operating method for a memory system, comprising:
storing victim block information in a buffer;
detecting a read reclaim safety period and generating a trigger signal;
detecting a remaining capacity of a queue during the safety period;
queuing as much of the buffered victim block information in the queue as the remaining capacity of the queue during the safety period; and
performing a read reclaim operation based on the queued victim block information during the safety period.

12. The operating method of claim 11, wherein the detecting of the remaining capacity of the queue, the queuing of the buffered victim block information in the queue and the performing of the read reclaim operation are carried out in response to the trigger signal.

13. The operating method of claim 11, wherein the victim block information is information on a target block for the read reclaim operation among host data blocks and system data blocks included in a memory device.

14. The operating method of claim 13, wherein the safety period is a period where a system data block which is a target for the read reclaim operation is in an idle state.

15. The operating method of claim 14, wherein the remaining capacity is a capacity of the queue being able to store the victim block information at a beginning of the safety period.

16. The operating method of claim 14, wherein the idle state is a state where the read reclaim operation is not performed on the system data block.

17. The operating method of claim 13, wherein the target block for the read reclaim operation is a block having a read count which is equal to or higher than a predetermined threshold value.

18. The operating method of claim 11, further comprising:
detecting a victim block which is a target for the read reclaim operation, and storing the detected victim block information in the buffer.

19. The operating method of claim 11, wherein the queuing of the buffered victim block information in the queue includes removing the victim block information queued in the queue among the buffered victim block information from the buffer.

20. The operating method of claim 11, wherein the victim block information is an address of a victim block which is a target for the read reclaim operation.

* * * * *